(12) United States Patent
Lee et al.

(10) Patent No.: US 8,057,195 B2
(45) Date of Patent: Nov. 15, 2011

(54) OUTER ROTOR TYPE FAN-MOTOR

(75) Inventors: Dong-Il Lee, Seoul (KR); Hyoun-Jeong Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 484 days.

(21) Appl. No.: 12/439,043

(22) PCT Filed: Aug. 29, 2007

(86) PCT No.: PCT/KR2007/004155
§ 371 (c)(1),
(2), (4) Date: Feb. 26, 2009

(87) PCT Pub. No.: WO2008/026876
PCT Pub. Date: Mar. 6, 2008

(65) Prior Publication Data
US 2010/0014995 A1    Jan. 21, 2010

(30) Foreign Application Priority Data
Aug. 30, 2006 (KR) .................. 10-2006-0083161

(51) Int. Cl.
*H02K 9/06* (2006.01)
*H02K 9/00* (2006.01)
*H02K 7/00* (2006.01)
*F04B 17/00* (2006.01)

(52) U.S. Cl. ......... 417/354; 417/423.8; 310/58; 310/62; 310/67 R (58) Field of Classification Search .................. None
See application file for complete search history.

(56) References Cited

FOREIGN PATENT DOCUMENTS

| KR | 10-2001-0006543 | 1/2001 |
| KR | 10-2001-0085229 | 9/2001 |
| KR | 10-2004-0047127 | 6/2004 |
| KR | 10-2005-0019351 | 3/2005 |

OTHER PUBLICATIONS

International Search Report dated Dec. 10, 2007.

*Primary Examiner* — Joseph L Williams
(74) *Attorney, Agent, or Firm* — KED & Associates, LLP

(57) ABSTRACT

An outer rotor type fan-motor includes: a rotational shaft; a bearing assembly that rotatably supports the rotational shaft; a stator installed at an outer side of the bearing assembly; a permanent magnet assembly that covers an outer side of the stator at a certain distance and is installed at the rotational shaft; and a fan that includes a shaft fixing part for fixing the rotational shaft, a hub for covering an outer side of the permanent magnet assembly at a certain distance and blades formed around the hub. An insulation space is formed between the permanent magnet assembly and the fan to prevent transfer of vibration and noise of the permanent magnet assembly to the fan, and vibration or noise of high frequency can be reduced.

17 Claims, 5 Drawing Sheets

OUTER ROTOR TYPE FAN-MOTOR

TECHNICAL FIELD

The present invention relates to an outer rotor type fan-motor and more particularly to an outer rotor type fan-motor capable of reducing high frequency noise from being emitted through a fan.

BACKGROUND ART

In general, as a blow fan applied to a refrigerator, an inner rotor-type fan motor in which a rotor installed within a stator is rotated has been known, and in such an inner-rotor type fan motor, cooling air is circulatively supplied into a refrigerator according to its blowing operation.

Recently, an outer rotor type fan-motor that can be made compact with respect to a diameter direction and an axial direction is employed in consideration of an installation space within the refrigerator.

Figure 1:
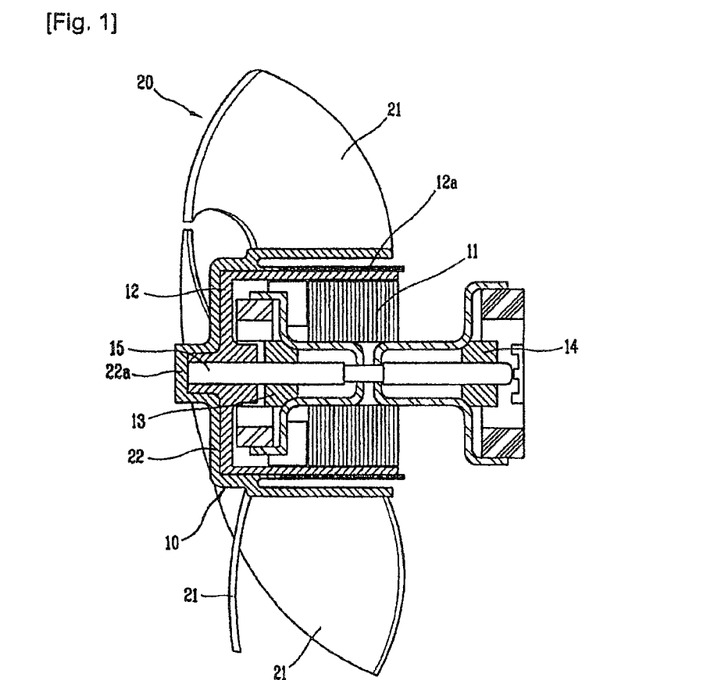
FIG. 1 is a sectional view showing an outer rotor type fan-motor according to the related art.

FIG. 1 is a perspective view of the related art outer rotor type fan-motor. As shown in FIG. 1, the outer rotor type fan-motor 10 includes a rear bearing assembly 14 substantially attached to a casing (not shown), a stator 11 attached to the rear bearing assembly 14, a front bearing assembly 13 attached to the stator 11, a rotor 12 having a rotational shaft 15, which is supported to be freely rotated by the both bearing assemblies 13 and 14, at its central portion, and a fan unit 20 installed at an outer circumference of the rotor 12.

In detail, the rotor 12 is disposed at an outer circumference of the stator 11 and has a cylindrical cup shape, and includes a permanent magnet 12a attached on an inner circumferential surface of the rotor 12. One end portion of the rotational shaft 15 is fixedly press-fit at a central portion of one end portion of the rotor 12.

With such a structure, in the so-called outer rotor type fan-motor 10, the rotational shaft 15 is rotatably supported by the front bearing assembly 13 and the rear bearing assembly 14, and the permanent magnet 12 is disposed to face the stator 11 with a slight space therebetween.

The fan unit 20 is made of a synthetic resin material and includes a hub 22 that covers the outer circumferential portion of the rotor 12 and a plurality of blades 21 extending in a diameter direction on an outer circumferential surface of the hub 22. An shaft fixing part 22a to be combined with the rotational shaft 15 is protrusively formed at the central portion of the hub 22.

The outer rotor type fan-motor 10 may be constructed by directly attaching the permanent magnet 12 on an inner surface of the hub 22.

Figure 2:
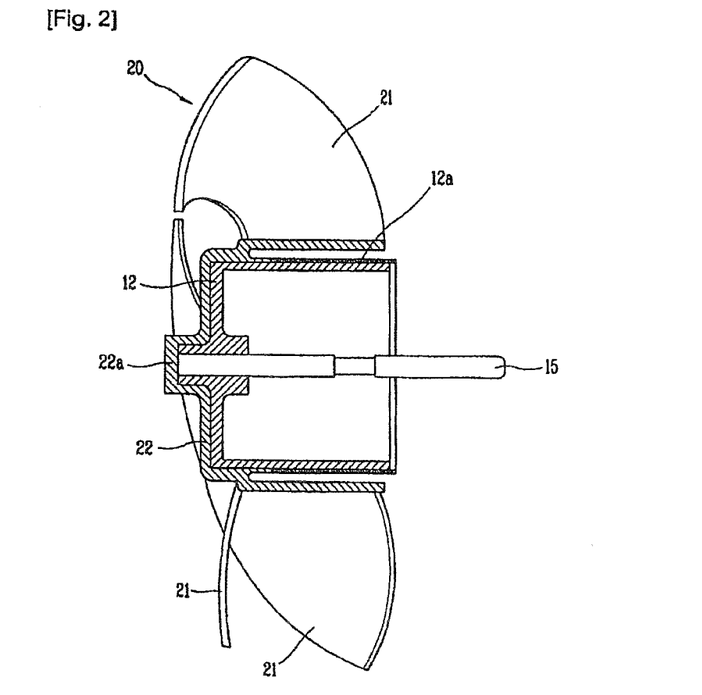
FIG. 2 is a sectional view showing a combined stated of a fan hub and a permanent magnet in FIG. 1.

With reference to FIG. 2, the outer circumference of the rotor 12 directly contacts and is combined with an inner surface of the bottom of the hub 22 of the fan unit 20.

The rotor 12 is rotated according to interaction between the stator 11 and the rotor 12, and as the hub 22 combined by directly contacting with an outer surface of the rotor 12 is rotated together with the rotor 12, the fan unit 20 is rotated.

Accordingly, in the related art fan motor 10 as described above, when the fan motor 10 is rotated, electromagnetic exciting force generated through the space between the stator 11 and the permanent magnet 12a excites the permanent magnet 12a and the exciting force is emanated through the fan unit 20 which directly contacts and is combined with the permanent magnet 12.

Meanwhile, in order to prevent vibration or noise of the permanent magnet 12 from being transferred to the fan unit 20, in some cases, an embossing surface is formed to minimize a contact portion in combining the rotor 12 or the permanent magnet 12 and the hub 22, but in this case, a partial noise is still emanated through the fan unit 20.

Figure 3:
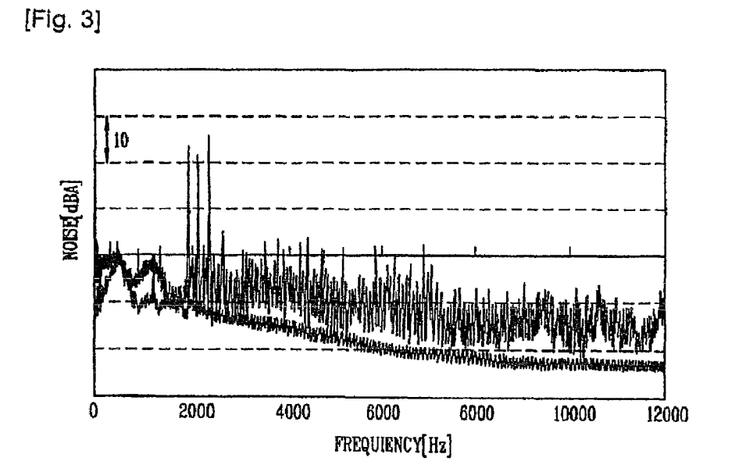
FIG. 3 is a graph showing experimental data of a relationship between frequency and noise of the outer rotor type fan-motor according to the related art.

As for the emanated noise, in the related art outer rotor type fan-motor, as shown in FIG. 3, a large amount of high frequency noise is generated in the frequency range of 2000 Hz or higher. In addition to the problem of the generation of the high frequency noise, the high frequency noise has a bad influence on the durability of the outer rotor type fan-motor especially in a resonated state.

TECHNICAL GIST OF THE PRESENT INVENTION

The present invention is designed to solve such problem of the related art, and therefore, one object of the present invention is to provide an outer rotor type fan-motor capable of reducing vibration or a high frequency noise by preventing vibration of a permanent magnet excited by an electromagnetic exciting force from being directly transferred to a fan.

Another object of the present invention is to provide an outer rotor type fan-motor capable of maintaining a combining force between a rotational shaft and a fan for a long time.

To achieve the above objects, there is provided an outer rotor type fan-motor including: a rotational shaft; a stator installed at an outer side of the rotational shaft; a permanent magnet assembly that covers an outer side of the stator at a certain distance and is installed at the rotational shaft; and a fan, at which the rotational shaft is fixed, that rotates together with the rotational shaft and includes a hub that covers an outer side of the permanent magnet assembly and blades formed on an outer surface of the hub, wherein an inner surface of the hub and an outer surface of the permanent magnet assembly are separated.

With such a structure, an exciting force generated from a permanent magnet or the permanent magnet assembly cannot be directly transferred to the fan but can be transferred through the rotational shaft, to thus reduce a high frequency noise.

Here, the permanent magnet assembly is combined only to the rotational shaft. The permanent magnet assembly has a cylindrical shape with one side opened and the other side thereof is combined with the rotational shaft. Accordingly, rotation of the permanent magnet assembly is transferred to the rotational shaft and rotation of the rotational shaft is transferred to the fan, resulting in that noise or exciting force of the permanent magnet assembly is transferred through the rotational shaft, not through the fan.

A step is formed along the circumstance of a rotational shaft insertion hole of the inner surface of the hub, through which the rotational shaft is fixedly combined, and a step is formed on an inner surface of the shaft fixing part. By forming such step, a flange part formed at the permanent magnet assembly can be prevented from contacting with the inner surface of the hub.

Preferably, the permanent magnet assembly is formed as an elastic body. By forming the permanent magnet assembly as the elastic body, the permanent magnet assembly can absorb the exciting force generated from the permanent magnet attached to the permanent magnet assembly.

A stopper for limiting an insertion depth of the rotational shaft is mounted at the shaft fixing part. The stopper can prevent an outer surface of the permanent magnet assembly combined with the rotational shaft from directly contacting with the inner surface of the hub by limiting the depth with which the rotational shaft is inserted into the shaft fixing part of the hub.

Herein, the stopper may be integrally formed with the shaft fixing part.

By integrally forming the stopper with the shaft fixing part, a process for installing the stopper at the shaft fixing part can be omitted, so the productivity and assembling characteristics of the fan can be improved.

A spring for maintaining the combining force between the fan and the rotational shaft is mounted on an outer surface of the shaft fixing part, and preferably, the spring has a cylindrical shape with one side where a slit is formed. Accordingly, the combining force between the shaft fixing part and the rotational shaft can be uniformly maintained, and possible weakening of the combining force between the rotational shaft and the shaft fixing part due to abrasion as the fan is used for a long time period can be prevented.

In addition, an adhesive for fixing the rotational shaft on the inner surface of the shaft fixing part may be applied to maintain the combining force between the rotational shaft and the shaft fixing part.

Meanwhile, a sound-absorbing member may be mounted on at least one of the outer surface of the permanent magnet assembly or the inner surface of the hub. This is to doubly prevent noise or vibration caused as the permanent magnet is excited from being transferred to the fan, together with the structure for combining the permanent magnet assembly and the hub.

To achieve the above objects, there is also provided an outer rotor type fan-motor including: a rotational shaft; a stator installed at an outer side of the rotational shaft; a permanent magnet assembly that covers an outer side of the stator at a certain distance and is installed at the rotational shaft; and a fan that includes a shaft fixing part for fixing the rotational shaft, a hub for covering an outer side of the permanent magnet assembly and blades formed on an outer surface of the hub, wherein an insulation space is formed between the permanent magnet assembly and the fan to reduce vibration or noise of the permanent magnet assembly from being transferred to the fan.

By forming the insulation space between the permanent magnet assembly and the hub of the pan, the transfer of vibration and noise of the permanent magnet assembly directly to the fan can be reduced.

Here, the permanent magnet assembly includes a cylindrical permanent magnet mounting part and a disk-type shaft support part that covers one end of the permanent magnet mounting part.

A permanent magnet is mounted on an inner surface of the permanent magnet mounting part and is installed to be spaced apart from the stator. This it to form an air gap between the permanent magnet assembly serving as a rotor and the stator.

In addition, a shaft tube through hole, through which the rotational shaft is insertedly fixed, is formed at a central portion of the shaft support part, and a flange part is protrusively formed along the circumference of the shaft tube through hole. Here, the flange part serves to prevent degradation of strength of the shaft tube through hole.

The insulation space is formed between an outer surface of the permanent magnet mounting part and an inner surface of the hub and between an outer surface of the shaft support part and the inner surface of the hub. Namely, by forming the insulation space over the entire outer surface of the permanent magnet assembly, the fan and the permanent magnet assembly can be prevented from directly contacting with each other.

Here, preferably, the space between the outer surface of the shaft support part and the inner surface of the hub is smaller than the space between the outer surface of the permanent magnet mounting part and the inner surface of the hub. The reason is to prevent occurrence of a resonance phenomenon as vibration caused by rotation of the blades formed on the outer surface of the hub positioned at the outer side of the permanent magnet mounting part is directly transferred to the permanent magnet assembly.

In addition, a bearing assembly that rotatably supports the rotational shaft is installed between the rotational shaft and the stator, and preferably, a bearing of the bearing assembly is an oilless bearing that does not need oil.

This is to prevent vibration or noise caused by air bubbles or foams that may be generated from oil such as a lubricant for lubricating the bearing or preventing abrasion of the bearing from being transferred to the rotational shaft.

As described above, the outer rotor type fan-motor according to the present invention can reduce vibration or high frequency noise by forming a vibration noise insulation space between the inner surface of the hub of the fan and the outer surface of the permanent magnet assembly to thus prevent the fan and the permanent magnet assembly from directly contacting with each other.

In addition, in the outer rotor type fan-motor according to the present invention, because the rotational shaft and the fan are combined with the spring or the adhesive, the combining force between the rotational shaft and the fan can be uniformly maintained, and thus, the combining force cannot deteriorate in spite of a long time use.

MODE FOR CARRYING OUT THE PREFERRED EMBODIMENTS

The foregoing and other objects, features, aspects and advantages of the present invention will become more apparent from the following detailed description of the present invention.

The construction and operation according to the embodiment of the present invention will now be described in detail with reference to the accompanying drawings.

In describing the present invention, a detailed description of a known function or structure will be omitted to clarify the gist of the present invention.

Figure 4:
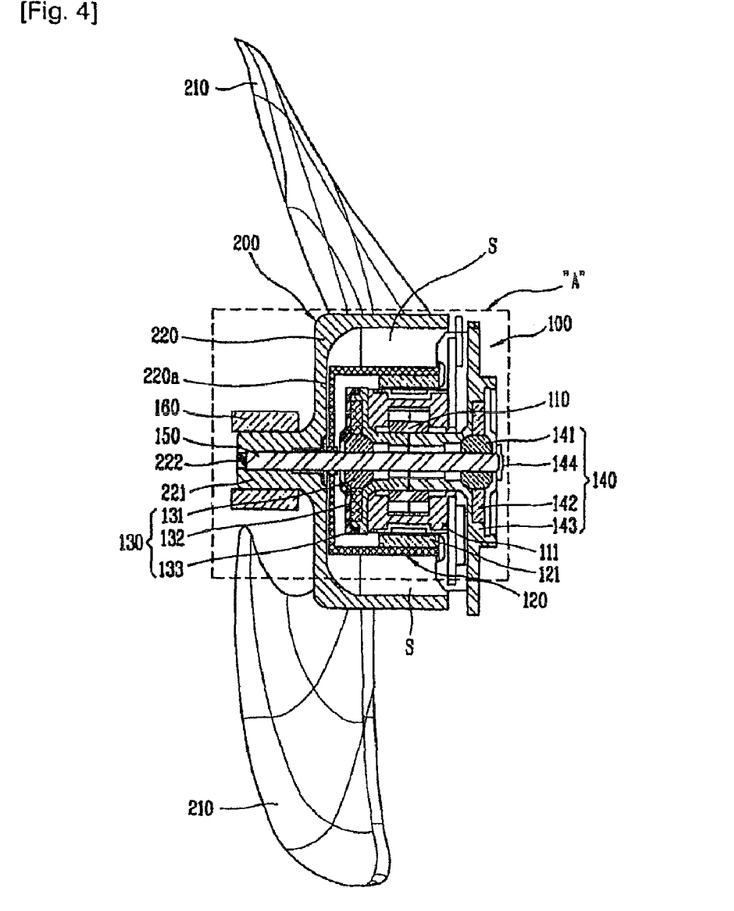
FIG. 4 is a sectional view showing an outer rotor type fan-motor according to an embodiment of the present invention.
Figure 5:
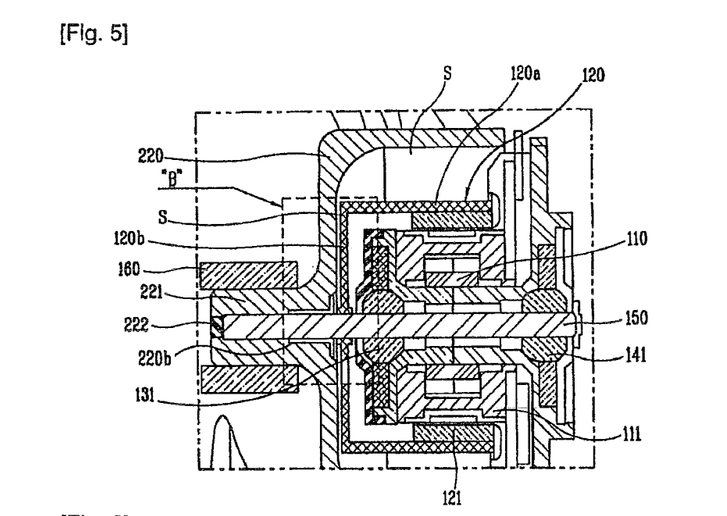
FIG. 5 is an enlarged view of a portion 'A' in FIG. 4.
Figure 6:
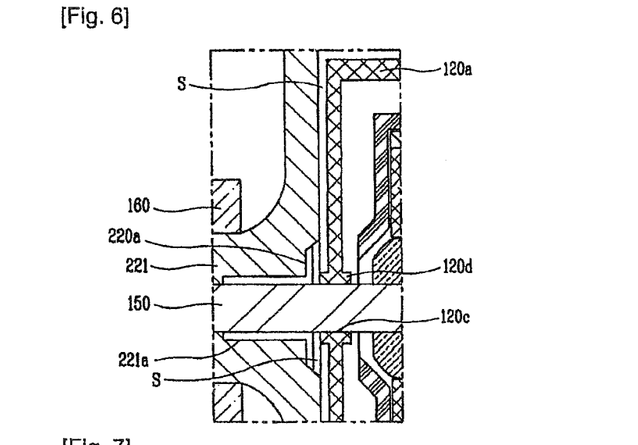
FIG. 6 is an enlarged view of a portion 'B' in FIG. 5.
Figure 7:
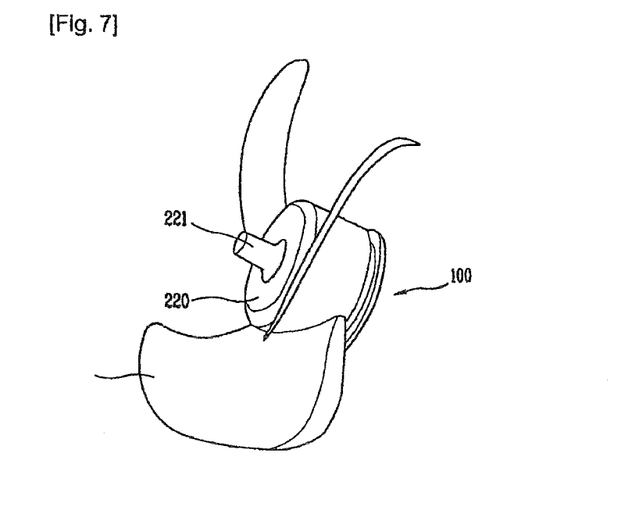
FIGS. 7 and 8 are perspective views of the outer rotor type fan-motor in FIG. 4.
Figure 8:
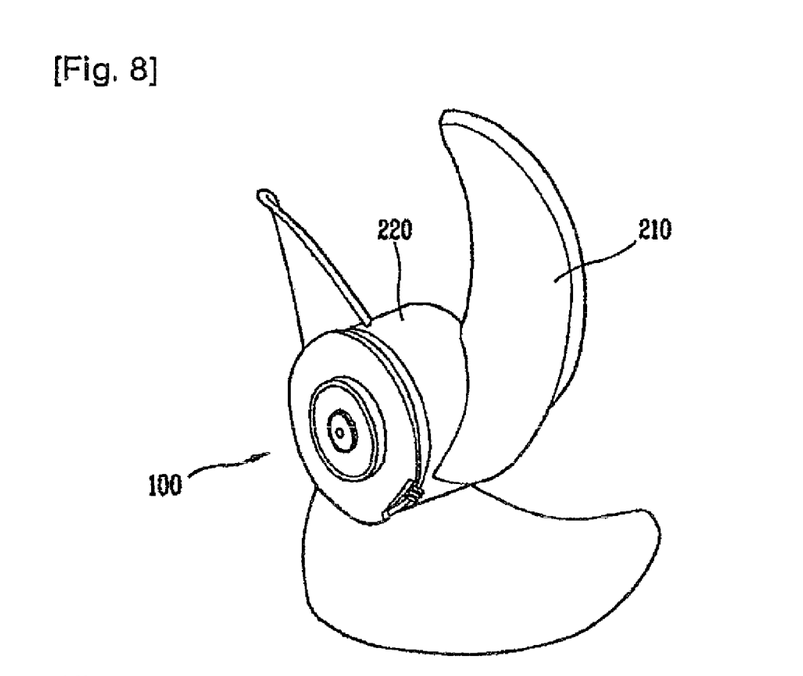
Figure 9:
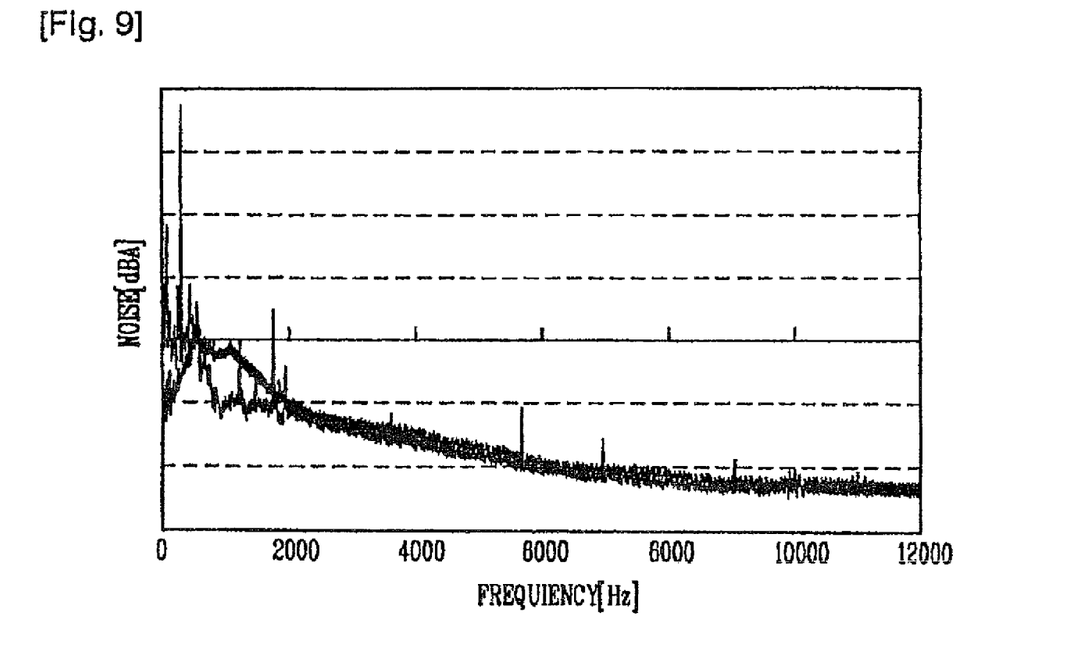
FIG. 9 is a graph showing experimental data of a relationship between frequency and noise of the outer rotor type fan-motor in FIG. 4.
Figure 10:
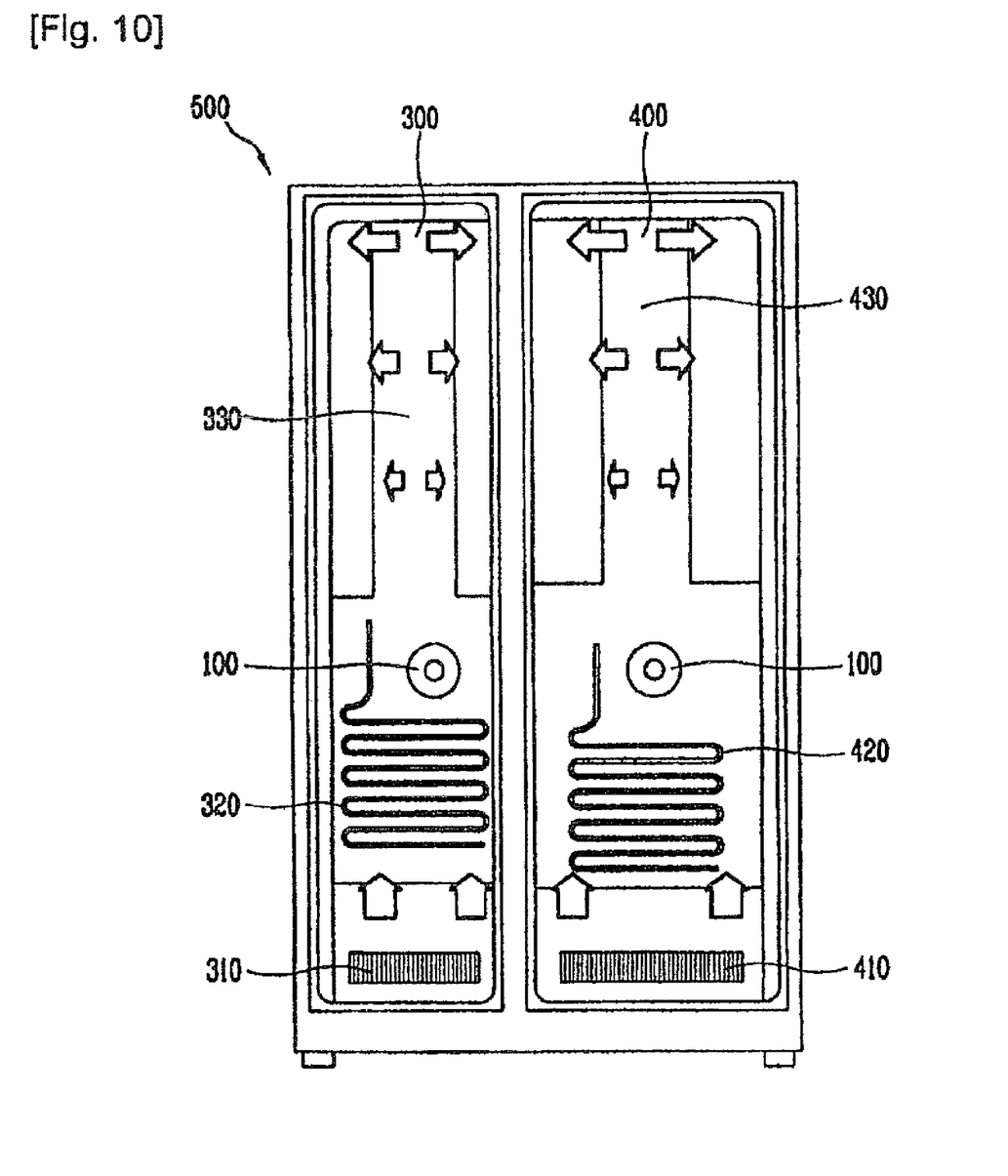
FIG. 10 is a view schematically showing an inner section of a refrigerator employing the outer rotor type fan-motor according to the embodiment of the present invention.

FIG. 4 is a sectional view showing an outer rotor type fan-motor according to an embodiment of the present invention, FIG. 5 is an enlarged view of a portion 'A' in FIG. 4, FIG. 6 is an enlarged view of a portion 'B' in FIG. 5, FIGS. 7 and 8 are perspective views of the outer rotor type fan-motor in FIG. 4, FIG. 9 is a graph showing experimental data of a relationship between frequency and noise of the outer rotor type fan-motor in FIG. 4, and FIG. 10 is a view schematically showing an inner section of a refrigerator employing the outer rotor type fan-motor according to the embodiment of the present invention.

As shown in FIG. 4, the outer rotor type fan-motor according to the embodiment of the present invention includes a rotational shaft 150, a pair of bearing assemblies 130 and 140 that rotatably support the rotational shaft 150, a stator 110 that fixedly mounted at an outer side of the pair of bearing assemblies 130 and 140, a permanent magnet assembly 120 installed at an outer side of the stator 110, a permanent magnet 121 mounted at the permanent magnet assembly 120, and a fan unit 200 that houses the permanent magnet assembly 120, one end of the rotational shaft 150 being fixedly combined with the fan unit 200.

The bearing assemblies 130 and 140 include bearings 131 and 141 that are formed to rotatably support the rotational shaft 150 and platy oil felts 132 and 142 installed on an outer circumferential surface of the bearings 131 and 141.

The oil felts 132 and 142 contain oil by themselves, so the bearings 131 and 141 can be operated without any additional oil. Namely, oilless bearing can be implemented.

In addition, because oil such as a lubricant for lubricating the bearings 131 and 141 is not required, the problem that vibration or noise is generated or oil function is degraded due to bubbles generated from oil while the bearings 131 and 141 are moved can be prevented in advance.

The bearings 131 and 141 and the oil felts 132 and 142 are supported by platy bearing frames 133 and 143 to thus form the respective bearing assemblies 130 and 140.

Here, a release preventing ring 144 is installed at one end of the rotational shaft 150 rotatably supported by the lower bearing assembly 140.

The stator 110 is fixedly installed along a circumferential direction at an outer side of the pair of bearing assemblies 130 and 140, and a bobbin (not shown) wound with winding coil 111 is installed at the stator 110.

The permanent magnet 121 is installed at an outer circumference of the stator with a certain space therebetween. The permanent magnet 121 is mounted at the permanent magnet assembly 120 which is formed substantially in a cylindrical shape or in a cup shape with one side opened and the other side closed.

Here, the permanent magnet assembly 120 serves as a rotor by itself.

A fan 200 is installed at an outer circumference of the permanent magnet assembly 120 such that a space is formed to be separated from an outer surface of the permanent magnet assembly 120.

Preferably, the fan 200 is an axial flow fan that includes a hub 220 formed to house the permanent magnet assembly 120, a plurality of blades 210 formed on the outer surface of the hub 220, and a shaft fixing part 221 formed to be protruded from a central portion of the outer surface of the hub, in which the rotational shaft 150 is fixedly combined. But, the present invention is not limited thereto.

A centrifugal fan, a turbo fan, and the like may be adopted according to the size of cooling capacity required by a refrigerator employing the fan 200.

Here, a stopper 222 for limiting the depth at which the rotational is inserted is installed at one end of the shaft fixing part 221, and a spring 160 for maintaining the combining force with the rotational shaft 150 is installed at an outer surface of the shaft fixing part 221.

The structure of the rotational shaft 150, the fan 200, and the permanent magnet assembly 120 will be described in detail with reference to FIGS. 5 and 6.

As shown in FIG. 5, the shaft fixing part 221 protrusively formed at the central portion of the outer surface of the hub 220 of the fan 200 includes a rotational shaft insertion hole 221b in which the rotational shaft 150 is fixedly combined. The stopper 222 for limiting the depth with which the rotational shaft 150 is inserted is formed at one end in the opposite direction in which the rotational shaft 150 is inserted.

The stopper 222 serves to prevent the outer surface of the permanent magnet assembly 120 from contacting with the inner surface of the hub 220 by limiting the depth with which the rotational shaft 150 is inserted in the shaft fixing part 221.

The stopper 222 may be formed as a separate member to be inserted into the rotational shaft insertion hole 221b of the shaft fixing part 221, or may be integrally formed with the shaft fixing part 221. In addition, a step may be formed at one end of the inner surface of the rotational shaft insertion hole 221b of the shaft fixing part 221 to limit the depth with which the rotational shaft 150 is inserted.

The substantially cylindrical spring 160 is mounted on an outer surface of the shaft fixing part 221. Because the spring 160 is installed on the outer surface of the shaft fixing part 221, the combining force between the rotational shaft 150 and the shaft fixing part 221 can be uniformly maintained and can be prevented from being degraded in spite of a long time use.

The spring 160 has the substantially cylindrical shape, and preferably, includes a slit (not shown) that penetrates the thickness thereof to facilitate its installation at the shaft fixing part 221 with an elastic restoration force.

In addition, in order to maintain the combining force between the rotational shaft 150 and the shaft fixing part 221, an adhesive may be applied to the rotational shaft insertion hole 221b of the shaft fixing part 221 and the rotational shaft 150 is then insertedly combined therein.

The permanent magnet assembly 120 is installed within the hub 220 of the fan 200, and in this case, the outer surface of the permanent magnet assembly 120 and the inner surface of the hub 220 do not contact with each other. In other words, the outer surface of the permanent magnet assembly 120 and the inner surface of the hub 220 are separated, between which a vibration noise insulation space (S) is formed.

Namely, the inner surface of the permanent assembly 120 is installed to be separated from the stator 110, and the outer surface of the permanent magnet assembly 120 is separated from the inner surface of the hub 220.

The permanent magnet assembly 120 has the cylindrical shape or the cup shape such that one side thereof is opened, in which the stator 110 is installed, the other side of the permanent magnet assembly 120 is closed, and a shaft through hole 120c is formed at a central portion thereof, through which the rotational shaft 150 is insertedly fixed.

That is, the permanent magnet assembly 120 includes a permanent magnet mounting part 120a formed in a cylindrical shape or formed like a circular wall, and a disk-type shaft support part 120b that is integrally formed with one end of the permanent magnet mounting part 120a.

Preferably, the permanent magnet assembly 120 is formed as an elastic body in order to absorb noise or vibration caused by the electromagnetic exciting force of the permanent magnet 121 and emanated to the fan 200.

The permanent magnet 121 is mounted on the inner surface of the permanent magnet mounting part 120a, and the permanent magnet 121 is mounted to be spaced apart from the stator 110.

Here, the permanent magnet 121 is made of plastic, on which parylene is coated to improve moisture-resistance reliability. Because the permanent magnet 121 is made of plastic, polar anisotropy magnetization can be easily made. A shaft through hole 120c is formed at the central portion of the shaft support part 120b, through which the rotational shaft 150 penetrates to be fixed.

A flange part 120d is protrusively formed at upper and lower portions along the periphery of the shaft through hole 120c in order to prevent degradation of strength that may be caused by the formation of the shaft through hole 120c. In this case, the flange part 120d is installed to be separated from the bearing assembly 130 and the hub 220.

The outer surface of the permanent magnet mounting part 120a is separated from the inner surface of the hub 220 to form the vibration noise insulation space (S), and the outer surface of the shaft support part 120b is separated from the inner surface of the hub 220 to form the vibration noise insulation space (S).

Here, the space between the outer surface of the shaft support part 120b and the inner surface of the hub 220 is narrower than the space between the outer surface of the permanent magnet mounting part 120a and the inner surface of the hub 220. The reason is to reduce a resonance phenomenon that since the blades 210 are formed on the outer surface of the hub 220 adjacent to the permanent magnet mounting part 120a, vibration due to the rotation of the blades 210 is directly transferred to the permanent magnet assembly 120, causing the resonance phenomenon.

Accordingly, an additional construction is required to reliably prevent the outer surface of the shaft support part 120b and the inner surface of the hub 220 from contacting, which will now be described with reference to FIG. 6.

As shown in FIG. 6, a step 221a is formed along a lengthwise direction of the rotational shaft 150 at the inner surface of the shaft fixing part 221, and a step 220a is formed along the circumference of the rotational shaft insertion hole 221b for combining the rotational shaft 150 of the inner surface of the hub 220.

By forming the steps 221a and 220a, the flange part 120d of the permanent magnet assembly 120 can be prevented from contacting with the inner surface of the hub 220 of the fan 200.

In addition, a sound-absorbing member (not shown) may be mounted at least one of the outer surface of the permanent magnet assembly 120 and the inner surface of the hub 220.

As stated above, because the vibration noise insulation space (s) is formed between the permanent magnet assembly 120 and the hub 220 of the fan 200, or because the sound-absorbing member (not shown) is installed together with the formation of the insulation noise insulation space (S), a direct transfer of the vibration or high frequency noise generated due to the excitation of the permanent magnet 121 to the fan 200 can be effectively prevented.

FIGS. 7 and 8 are perspective views of the outer rotor type fan-motor with an axial flow fan according to the embodiment of the present invention.

With such a construction, as shown in FIG. 9, it is noted that, in the outer rotor type fan-motor 100 according to the embodiment of the present invention, high frequency noise is not generated in the frequency range of 2000 Hz or higher, compared with the related art outer rotor type fan-motor (refer to FIG. 3).

With reference to FIG. 10, a refrigerator employing the outer rotor type fan-motor 100 according to the embodiment of the present invention includes: evaporators 320 and 420 installed, respectively, at a freezing chamber 300 and a refrigerating chamber 400; the outer rotor type fan-motors 100 that are installed at the freezing chamber 300 and at the refrigerating chamber 400 to blow cooling air thereinto and include the rotational shaft 150, the bearing assemblies 130 and 140 rotatably supporting the rotational shaft 150, a stator 110 installed at the outer side of the bearing assemblies 130 and 140, the permanent magnet assembly 120 covering the outer side of the stator at a certain distance and installed at the rotational shaft 150, and the fan 200 having the hub 220 with the shaft fixing part 221 for fixing the rotational shaft 150 and covering the outer side of the permanent magnet assembly 120 at a certain distance and the blades 210 formed around the hub 220, the insulation space (S) for preventing vibration and noise of the permanent magnet assembly 120 from being transferred to the fan 200 being formed between the permanent magnet assembly 120 and the fan 200; and cooling air ducts 330 and 430 that supplies the cooling air blown by the outer rotor type fan-motor 100 to the freezing chamber 300 and the refrigerating chamber 400.

Reference numeral 310 denotes a cooling air inlet of the freezing chamber 300, and 410 denotes a cooling air inlet of the refrigerating chamber 400.

The operation of the outer rotor type fan-motor 100 according to the embodiment of the present invention with the construction as shown in FIGS. 4 to 6 will be described as follows.

When the user supplies external power to the outer rotor type fan-motor 100, a rotational force is generated by electromagnetic interaction between the stator 110 and the permanent magnet 121, and the permanent magnet assembly 120 with the permanent magnet 121 is rotated according to the rotational force.

Then, the rotational shaft 150 combined in the shaft through hole 120c of the permanent magnet assembly 120 is rotated and the fan 200 having the shaft fixing part 21 in which the rotational shaft 150 is fixed is also rotated to supply cooling air to the freezing chamber 300 or to the refrigerating chamber 400 through the cooling air ducts 330 and 340 of the refrigerator 500.

Here, because the permanent magnet assembly 120 and the hub 220 are separately installed to form the vibration noise insulation space (S) between the permanent magnet assembly 120 and the hub 220, the electromagnetic exciting force generated through the space between the permanent magnet 121 and the stator 110 is transferred to the fan 200 through the rotational shaft 150, rather than being directly transferred to the fan 200, and thus, generation of the high frequency noise can be reduced.

In addition, by providing the spring 160 or by applying the adhesive, the combining force between the rotational shaft 150 and the shaft fixing part 221 can be uniformly maintained for a long time.

The foregoing description of the preferred embodiments of the present invention has been presented for the purpose of illustration and description, and the coverage of the present invention is not limited to such particular embodiments and can be suitably modified within the scope of the invention defined by the claims appended hereto and their equivalents.

INDUSTRIAL APPLICABILITY

As so far described, the outer rotor type fan-motor according to the embodiment of the present invention can be applicable to various electric devices as well as a freezing device such as the refrigerator or an air-conditioning system such as an air-conditioner.

The invention claimed is:

1. An outer rotor type fan-motor comprising:
a rotational shaft;
a stator installed at an outer side of the rotational shaft;
a permanent magnet assembly that covers an outer side of the stator at a certain distance and is installed at the rotational shaft; and
a fan, at which the rotational shaft is fixed, that is rotated together with the rotational shaft and includes a hub that covers an outer side of the permanent magnet assembly and blades formed on an outer surface of the hub, wherein an inner surface of the hub and an outer surface of the permanent magnet assembly are separated.

2. The fan motor of claim 1, wherein a step is formed along the circumference of a rotational shaft insertion hole formed to fix the rotational shaft on a portion of the inner surface of the hub where the rotational shaft is fixed, and the surface where the step is formed crosses the rotational shaft.

3. The fan motor of claim 1, wherein the fan comprises a shaft fixing part for fixing the rotational shaft, and a step is formed along a lengthwise direction of the rotational shaft on an inner surface of the shaft fixing part.

4. The fan motor of claim 1, wherein the permanent magnet assembly is formed as an elastic body for absorbing an electromagnetic exciting force generated through a space between the stator and the permanent magnet assembly.

5. The fan motor of claim 1, wherein a stopper for limiting an insertion depth of the rotational shaft is mounted at the shaft fixing part.

6. The fan motor of claim 5, wherein the stopper is integrally formed with the shaft fixing part.

7. The fan motor of claim 1, wherein a spring for maintaining a combining force between the fan and the rotational shaft is mounted on the outer surface of the shaft fixing part.

8. The fan motor of claim 7, wherein the spring has a cylindrical shape with a slit at one side thereof.

9. The fan motor of claim 1, wherein an adhesive is applied to the inner surface of the shaft fixing part in order to maintain the combining force between the fan and the rotational shaft.

10. The fan motor of claim 1, wherein a sound-absorbing member is installed on at least one of the outer surface of the permanent magnet assembly and the inner surface of the hub.

11. An outer rotor type fan-motor comprising:
a rotational shaft;
a stator installed at an outer side of the rotational shaft;
a permanent magnet assembly that covers an outer side of the stator at a certain distance and is installed at the rotational shaft; and
a fan that includes a shaft fixing part for fixing the rotational shaft, a hub for covering an outer side of the permanent magnet assembly and blades formed on an outer surface of the hub, wherein an insulation space is formed between the permanent magnet assembly and the fan to reduce vibration or noise of the permanent magnet assembly from being transferred to the fan.

12. The fan motor of claim 11, wherein the permanent magnet assembly comprises: a cylindrical permanent magnet mounting part; and a disk-type shaft support part that covers one end of the permanent magnet mounting part.

13. The fan motor of claim 12, wherein a permanent magnet is mounted on an inner surface of the permanent magnet mounting part and separately installed at a certain distance from the stator.

14. The fan motor of claim 12, wherein a shaft through hole is formed at a central portion of the shaft support part, in which the rotational shaft is insertedly fixed, and a flange part is protrusively formed along the circumference of the shaft through hole.

15. The fan motor of claim 14, wherein the insulation space is formed between an outer surface of the permanent magnet mounting part and an inner surface of the hub and between the outer surface of the shaft support part and the inner surface of the hub.

16. The fan motor of claim 15, wherein the space between the outer surface of the shaft support part and the inner surface of the hub is smaller than the space between the outer surface of the permanent magnet mounting part and the inner surface of the hub.

17. The fan motor of claim 14, wherein a bearing assembly is installed between the rotational shaft and the stator in order to rotatably support the rotational shaft, and a bearing of the bearing assembly is an oilless bearing that does not need oil.

* * * * *